US 9,787,370 B2

(12) United States Patent
Li et al.

(10) Patent No.: US 9,787,370 B2
(45) Date of Patent: Oct. 10, 2017

(54) DYNAMIC CLUSTERING FOR RADIO COORDINATION IN A VIRTUAL NETWORK

(71) Applicant: Huawei Technologies Co., Ltd., Shenzhen, Guangdong (CN)

(72) Inventors: Xu Li, Ontario (CA); Ngoc-Dung Dao, Ontario (CA); Hang Zhang, Ontario (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 52 days.

(21) Appl. No.: 14/672,572

(22) Filed: Mar. 30, 2015

(65) Prior Publication Data

US 2015/0311961 A1    Oct. 29, 2015

Related U.S. Application Data

(60) Provisional application No. 61/973,102, filed on Mar. 31, 2014.

(51) Int. Cl.
  *H04W 24/02*  (2009.01)
  *H04B 7/024*  (2017.01)
  *H04L 29/08*  (2006.01)

(52) U.S. Cl.
  CPC ............. *H04B 7/024* (2013.01); *H04L 67/10* (2013.01); *H04W 24/02* (2013.01)

(58) Field of Classification Search
  CPC ......... H04B 7/024; H04W 24/02; H04L 67/10
  See application file for complete search history.

(56) References Cited

U.S. PATENT DOCUMENTS

| 9,264,935 | B2* | 2/2016 | Gu |
|---|---|---|---|
| 2005/0201572 | A1* | 9/2005 | Lindahl ................. H03G 5/165 381/103 |
| 2010/0034151 | A1 | 2/2010 | Alexiou et al. |
| 2012/0094710 | A1* | 4/2012 | Jia ....................... H04W 72/044 455/524 |

FOREIGN PATENT DOCUMENTS

| CN | 101877918 A | 3/2010 |
|---|---|---|
| CN | 102113395 A | 6/2011 |
| CN | 103139913 A | 5/2013 |

OTHER PUBLICATIONS

PCT International Search Report, dated Jun. 18, 2015.

* cited by examiner

*Primary Examiner* — Mohammad Anwar
(74) *Attorney, Agent, or Firm* — Slater Matsil, LLP

(57) ABSTRACT

An apparatus for adaptively defining clusters transmit points for coordination in a communication network includes a circuit that receives radio frequency channel information corresponding to the transmit points and defines a subset of the transmit points based at least in part on the radio frequency communication channel information. The subset is interrelated by a contiguous chain of dominant interference relationships between pairs of the transmit points. The apparatus further includes a processor that independently coordinates radio communications among the subset of transmit points.

21 Claims, 7 Drawing Sheets

DYNAMIC CLUSTERING FOR RADIO COORDINATION IN A VIRTUAL NETWORK

CROSS-REFERENCE TO RELATED APPLICATIONS

This application claims the benefit of U.S. Provisional application Ser. No. 61/973,102, filed Mar. 31, 2014, which is incorporated by reference herein.

TECHNICAL FIELD

This description relates generally to wireless communications networks, and more particularly to reducing interference in a wireless communications network.

BACKGROUND

Wireless, or radio frequency (RF), communications systems have been used extensively in telecommunications and data networks. Some wireless networks operate on a single radio frequency channel, while other wireless networks operate on multiple channels. In both single-channel and multichannel wireless networks, co-channel interference (CCI) is known to be a factor that can affect wireless system capacity and, consequently, user quality of experience (QoE).

Radio resource management (RRM) techniques generally offer system-level control of co-channel interference by properly adjusting certain system parameters in the time, frequency, power, and spatial domains. Radio resource management can enable relatively efficient use of the limited radio resources and radio network infrastructure to provide improved system capacity and enhanced QoE. Typical control strategies include, for example, enhanced inter-cell interference coordination (eICIC), frequency reuse, power control, beamforming, or a combination of these.

Coordinated multi-point transmission (CoMP) techniques have allowed multiple base stations to jointly serve a mobile station. In CoMP, the serving base stations act as a distributed antenna array to transmit signals from the network to the mobile device. Spatial domain beamforming and precoding typically have been used to improve spatial multiplexing gain. However, the performance of these techniques can be sensitive to channel estimation error.

In general, transmitting to receivers with an increased power improves the signal-to-noise ratio (SNR), which enhances data rate and increases spectrum efficiency. However, high transmit power can lead to increased co-channel interference. Conventional power control techniques have focused on transmit power settings for individual transmit points.

Solutions employing coordination of multiple transmit points within a network, or radio coordination (RC), to reduce or control co-channel interference have typically modeled the entire network or fixed groupings of transmit points. Ideally, an RC solution would jointly optimize the transmission parameters of all transmit points throughout the network. However, regarding relatively large networks, a network-wide optimization solution may include an unacceptable level of complexity. Further, if network congestion occurs at relatively few, relatively isolated transmit points, optimization of the entire network may not be necessary to ensure acceptable performance.

SUMMARY

According to one embodiment of the present invention, an apparatus for adaptively defining clusters of transmit points for coordination in a communication network includes a circuit that receives radio frequency channel information corresponding to the transmit points and defines a subset of the transmit points based at least in part on the radio frequency communication channel information. The subset of the transmit points is interrelated by a contiguous chain of dominant interference relationships between pairs of the transmit points.

According to another embodiment of the present invention, a method for adaptively defining clusters of transmit points for coordination in a communication network includes receiving, with a processor, radio frequency communication channel information corresponding to the transmit points, and defining a subset of the transmit points based at least in part on the radio frequency communication channel information. The subset of the transmit points is interrelated by a contiguous chain of dominant interference relationships between pairs of the transmit points.

According to yet another embodiment of the present invention, a method for adaptively defining clusters of transmit points for coordination in a communication network includes receiving, with a processor, radio frequency communication channel information corresponding to the transmit points. The method also includes deriving dominant interference relationships between pairs of the transmit points based at least in part on the radio frequency communication channel information, and constructing an undirected graph including vertices representing a subset of the transmit points and arcs between pairs of the vertices. The arcs represent a contiguous chain of the dominant interference relationships. The method further includes defining the subset of the transmit points as a radio coordination cluster.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
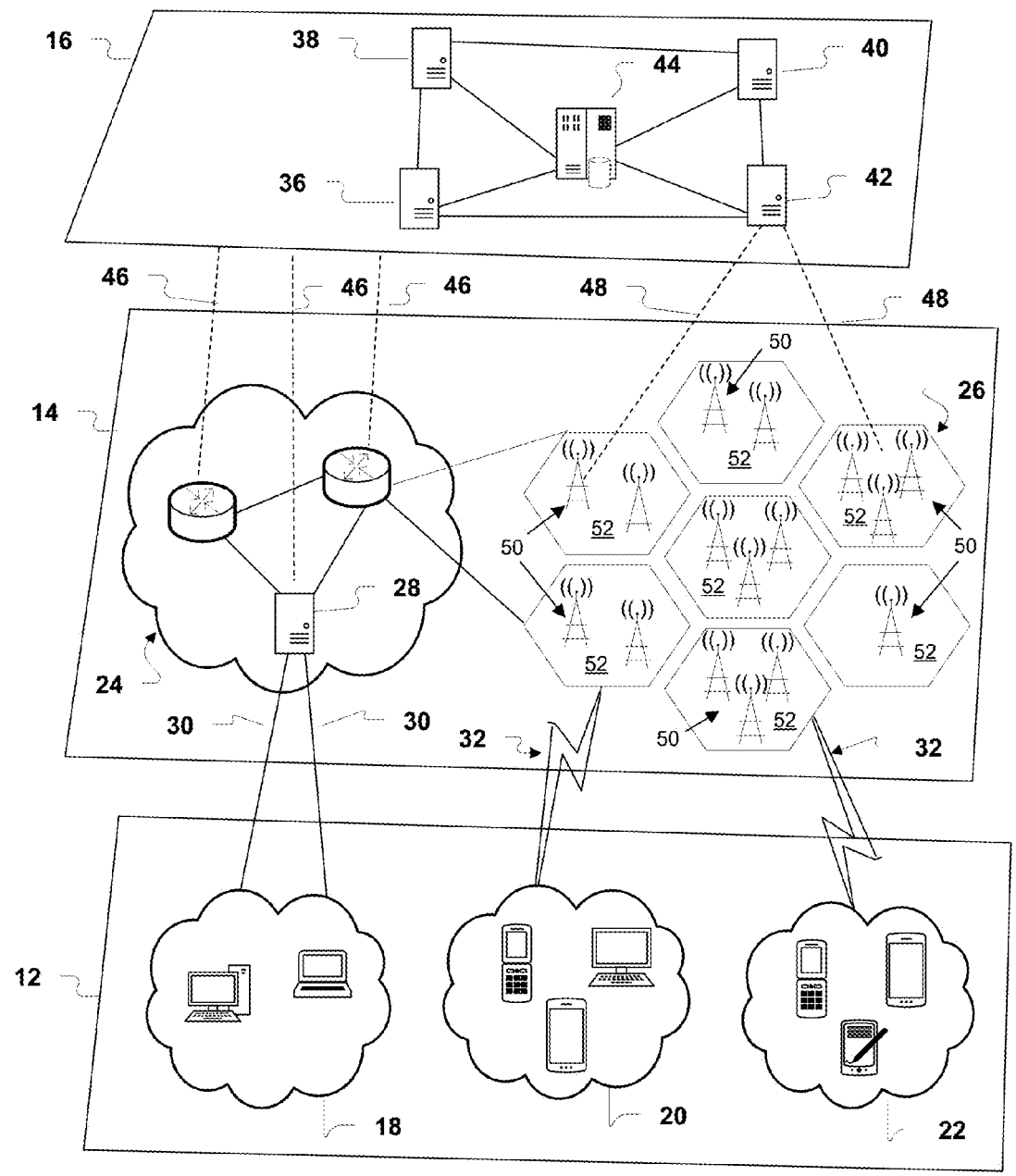
FIG. 1 is an illustration of an exemplary wireless network control scheme in accordance with an embodiment of the present invention.

An embodiment of the present invention is shown in FIG. 1, which illustrates an exemplary wireless network control scheme, such as a cloud-based radio access network coordination framework incorporating the software defined networking (SDN) concept, organized as three decoupled planes: a user plane 12, a data plane 14 and a control plane 16. The user plane includes network users, such as the wired user group 18, the wireless user group 20, and the wireless user group 22.

The data plane includes the physical network components, such as the wired communication network 24 and the wireless communication network 26, which includes multiple transmit points, or base stations 50, organized into multiple clusters 52. A transmit point can include, for example, a base station, a relay, a Node B, an enhanced Node B (eNB), WiFi Access Point, or the like.

The wired user group 18 is communicatively connected to the wired communication network 24, for example, by way of the ingress server 28 and data links 30. The wireless user groups 20, 22 are communicatively interconnected to the wireless communication network 26, for example, by way of the radio frequency channels 32.

The control plane 16 provides network control functionality through a number of logical components, including a congestion detection server 36, a traffic engineering (TE) optimizer 38, a quality of experience (QoE) manager 40, a transmit point coordinator 42 and a database 44. These components implement distinct functions and work together to optimize network operation in the data plane and to maximize quality of experience (QoE) in the user plane. It will be understood by those skilled in the art that these elements may be physical or virtual nodes in the network, and it is possible that when implemented as functional elements, that they may be implemented across a number of physical computing devices. Similarly, it is possible for more than one of the functional elements to be resident on a single computing platform.

For example, the congestion detection server 36 detects, or predicts, congestion in network transmit points by analyzing transmit point loads and TE optimizer decisions. The traffic engineering optimizer 38 determines routing paths and resource allocation along the network paths for traffic flows. The QoE manager 40 collects and processes QoE reports from users, and uses the reports to manipulate the operation of other control plane entities as well as data plane hardware.

The transmit point coordinator 42 conducts coordination of multiple transmit points within the network, or radio coordination (RC). The transmit point coordinator 42 receives information from the congestion detection server 36 and the TE optimizer 38 to determine whether congestion could occur in the network.

If congestion is identified or if potential congestion is predicted, using information from the QoE manager and the database component, transmit point coordinator 42 defines, or delimits, clusters of multiple transmit points in the network and coordinates the radio communications of each cluster. Cluster-based power control is employed as the predominant radio coordination technique within the framework. The transmit point coordinator 42 dynamically forms clusters according to current network state and channel conditions.

The database 44 stores network state information, such as transmit point loading, QoE status of users applications, and the like. The various components of the control plane 16 communicate with the various components of the data plane 14, for example, by way of the control links 46. In particular, the transmit point coordinator 42 communicates with the transmit points 50 by way of control links 48.

In the following discussion, a primary node is a transmit point that experiences congestion or low utilization. Load-sharing nodes are transmit points that send data to users served by primary nodes. Direct interfering nodes are transmit points that cause significant interference to users of primary nodes. Indirect interfering nodes are transmit points that cause significant interferences to users of load-sharing or direct interfering nodes. Transmit points that may potentially cause interference to users served by primary nodes, but have no data, are not included in the cluster and may automatically be turned off.

Figure 2:
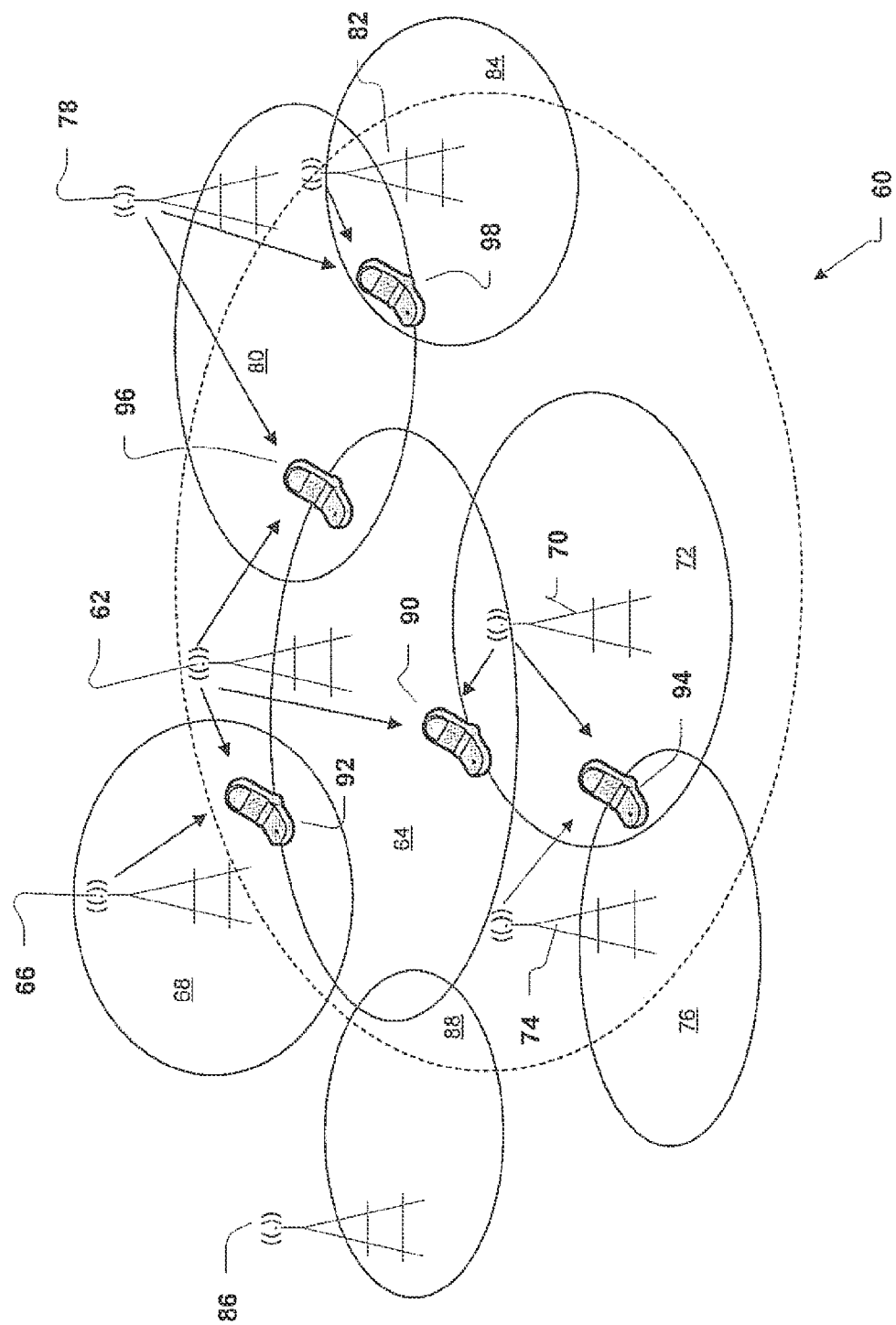
FIG. 2 is an illustration of an exemplary co-channel interference control cluster in a wireless network in accordance with an embodiment of the present invention.

Referring to FIG. 2, the communication activities related to an exemplary co-channel interference control cluster 60 during a brief period of time are depicted. The cluster 60 includes a primary node 62 having a primary broadcast coverage area 64, an interfered node 66 having an interfered broadcast coverage area 68, a directly interfering node 70 having a directly interfering broadcast coverage area 72, a first indirectly interfering node 74 having a first indirectly interfering broadcast coverage area 76, a load-sharing node 78 having a load-sharing broadcast coverage area 80, a second indirectly interfering node 82 having a second indirectly interfering broadcast coverage area 84. In addition, an external node 86 that is not part of the cluster 60 has an external broadcast coverage area 88 that overlaps with a portion of the primary broadcast coverage area 64.

The primary node 62 transmits a first data message to a first user 90 at a particular radio frequency, or over a particular channel. During the transmission of the first data message by the primary node 62, the interfered node 66 transmits a second data message to a second user 92 at the same radio frequency, or over the same channel. Because at the time of the transmissions the second user 92 is located in an area of overlap between the primary broadcast coverage area 64 and the interfered broadcast coverage area 68, the transmission of the first data message by the primary node 62 causes significant interference with the transmission of the second data message by the interfered node 66 at the location of the second user 92.

During the transmission of the first data message by the primary node 62, the directly interfering node 70 transmits a third data message to a third user 94 at the same particular radio frequency. Because at the time of these transmissions the first user 90 is located in an area of overlap between the primary broadcast coverage area 64 and the directly interfering broadcast coverage area 72, the transmission of the third data message by the directly interfering node 70 causes significant interference with the transmission of the first data message by the primary node 62 at the location of the first user 90.

In addition, the indirectly interfering node 74 transmits a fourth data message over the same channel during the transmission of the third data message by the directly interfering node 70. Because at the time of these transmissions the third user 94 is located in an area of overlap between the directly interfering broadcast coverage area 72 and the indirectly interfering broadcast coverage area 76, the transmission of the fourth data message by the indirectly interfering node 74 causes significant interference with the transmission of the third data message by the directly interfering node 70 at the location of the third user 94.

Further, the primary node 62 also transmits part of a fifth data message to a fourth user 96. The load-sharing node 78 transmits an additional part of the fifth data message to the fourth user 96. Meanwhile, the load-sharing node 78 transmits a sixth data message to a fifth user 98. During this transmission, the second indirectly interfering node 82 transmits a seventh data message. Because at the time of the transmissions the fifth user 98 is located in an area of overlap between the load-sharing broadcast coverage area 80 and second indirectly interfering broadcast coverage area 84, the transmission of the seventh data message by the second indirectly interfering node 82 causes significant interference with the transmission of the sixth data message by the load-sharing node 78 at the location of the fifth user 98.

Throughout the period of time depicted in FIG. 2, the external node 86 does not transmit any data. As a result, even though the external node 86 has an external broadcast coverage area 88 that overlaps with a portion of the primary broadcast coverage area 64, the external node 86 is not included in the cluster 60.

Figure 3:
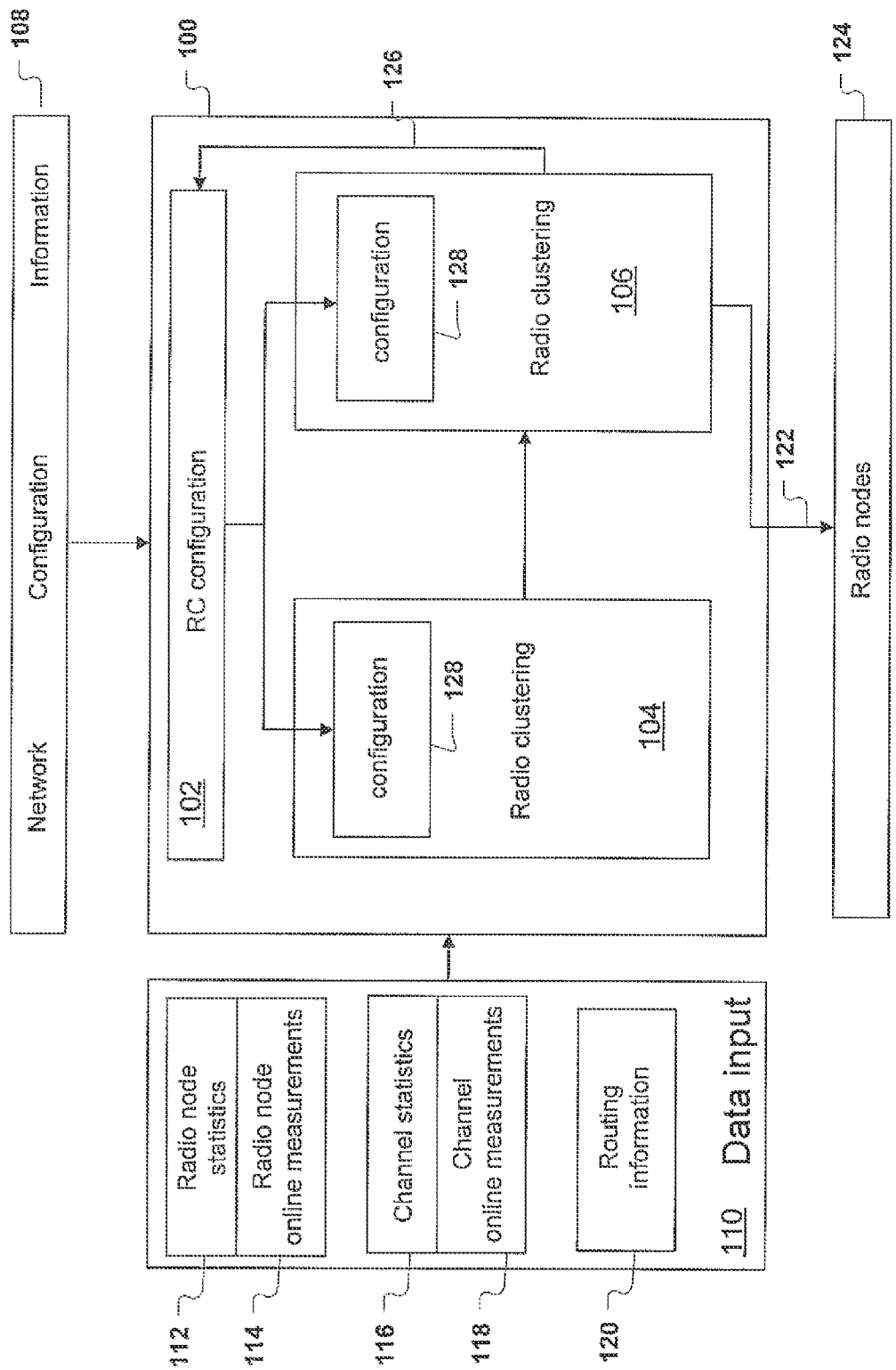
FIG. 3 is a block diagram depicting an exemplary co-channel interference control system that implements radio coordination with dynamic clustering in accordance with an embodiment of the present invention.

Referring to FIG. 3, an exemplary co-channel interference control system 100 that implements radio coordination (RC) with dynamic transmit point clustering is depicted. The co-channel interference control system 100 can be implemented, for example, in the transmit point coordinator 42 of FIG. 1. The co-channel interference control system 100 includes a configuration module 102, a cluster module 104, and a coordination module 106.

The co-channel interference control system 100 receives as input configuration information 108 and data input 110. The configuration information includes, for example, the initial selection regarding the radio clustering algorithm, the initial selection regarding the radio coordination algorithm, the parameter setup for the radio clustering and radio coordination algorithms, a listing of the physical transmit points 124 that are active in the network, and connectivity information regarding wired connections in the network. The data input 110 includes, for example, transmit point information, such as statistics 112 and online measurements 114; radio frequency channel information, such as statistics 116 and online measurements 118, for example, interference relationship information; and routing information 120, such as traffic engineering data from a traffic engineering optimizer, or communication traffic congestion information from a congestion detection server. In various embodiments, the data input 110 is obtained through message passing, for example, from other network entities or from one or more shared databases. The co-channel interference control system 100 provides as output control commands 122 to the transmit points 124 in the network.

The configuration module 102 receives the configuration information 108, along with signaling information, or feedback 126, from the coordination module 106. The configuration module 102 uses the configuration information 108 and the feedback 126 to create a current configuration model 128, including configuration parameters, such as transmit point and cluster information, a selection regarding the radio clustering algorithm, a selection regarding the radio coordination algorithm, radio clustering algorithm parameters, and radio coordination algorithm parameters, to each the cluster module 104 and the coordination module 106.

For example, in some embodiments, configuration parameters include a communication channel spectrum efficiency threshold value for determining interference relationships, an expected cluster size range, an expected cluster RC capability range, an interference set extension value (for example, number of hops in a graph), a radio coordination capability evaluation option (such as total size, relative size, total weight, relative weight, or the like), and a Dominant interference evaluation option [such as signal-to-interference-plus-noise ratio (SINR)-based, load-aware, or the like].

The cluster module 104 dynamically determines which network transmit points can be advantageously grouped together in clusters for radio coordination. The cluster module 104 makes clustering decisions based on the data input 110 and the configuration 128, and informs the coordination module 106 of proposed clustering. The transmit point clustering facilitates closed-loop control to allow the network to continuously adapt to network configuration changes and network traffic dynamics in order to maintain relatively high radio coordination performance. In general, clustering facilitates coordinated network traffic engineering and radio coordination in software-defined networks (SDN).

The coordination module 106 performs radio coordination techniques to coordinate the radio communication among each cluster of transmit points 124. The coordination module 106 receives the data input 110 and clustering output and makes decisions regarding the transmit point parameter setup, which depends on the employed radio coordination scheme. The coordination module 106 sends the parameter setup, or transmission parameters, to the transmit points 124, and provides feedback 126, regarding the decision quality to the configuration module 102 for adaptive radio coordination configuration management. In various embodiments, the signaling content of the feedback 126 includes, for example, throughput per user, a measurement of rate fairness among users, or the like.

Radio coordination in the power domain can provide performance advantages in some scenarios, for example, high user mobility, limited feedback channel capacity, and channel aging due to feedback and processing delays. Dynamic clustering solutions in the power domain within the framework of on-demand radio coordination for software-defined radio access networks can provide advantages in wireless communications networks that are dense in terms of the number of transmit points and wireless devices, and in which services can be provided by multiple operators with differing radio access technologies.

Figure 4:
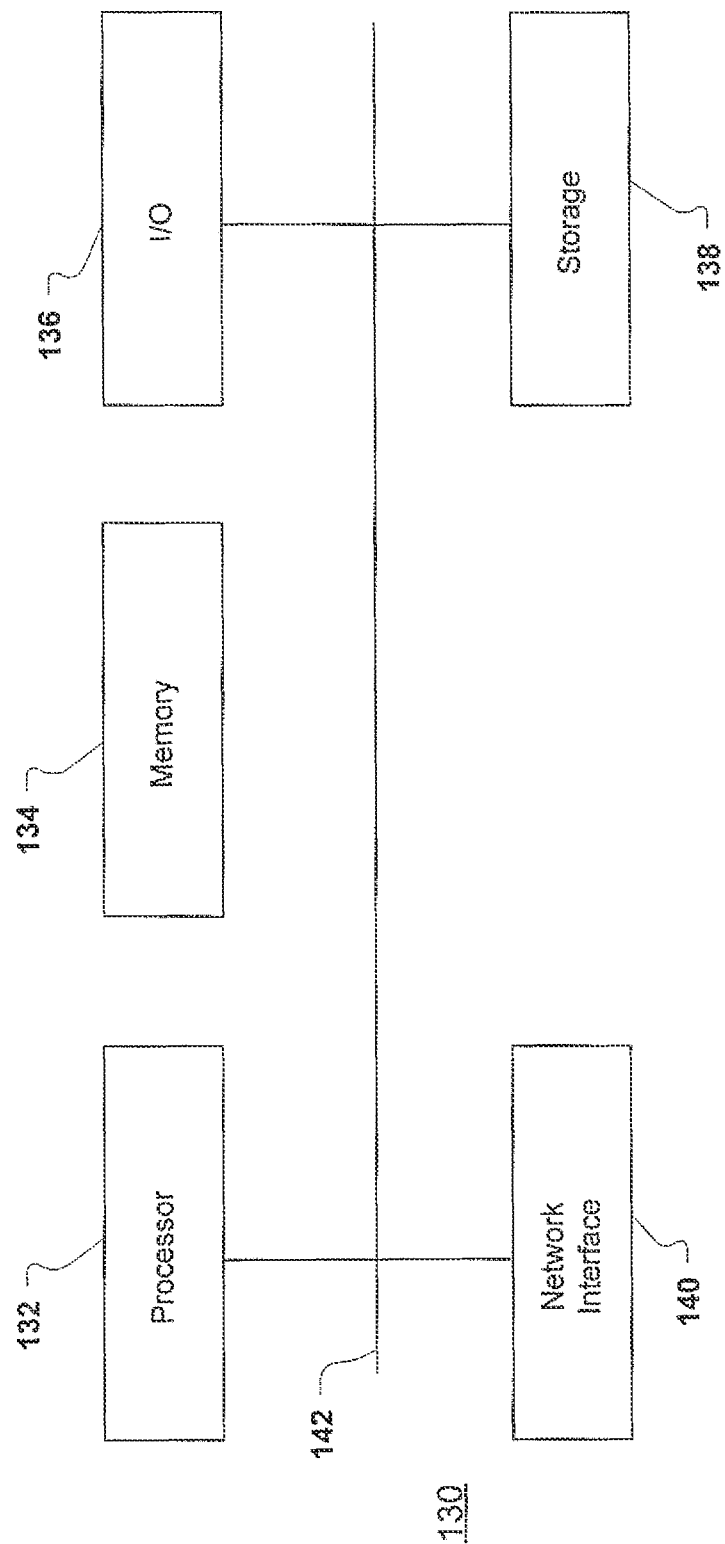
FIG. 4 is a schematic view depicting an exemplary general computing system that can be employed in the co-channel interference control system of FIG. 3.

As illustrated in FIG. 4, an exemplary general computing device 130 that can be employed in the exemplary co-channel interference control system 100 of FIG. 3 includes a processor 132, a memory 134, an input/output device (I/O) 136, a storage 138 and a network interface 140. The various components of the computing device 130 are coupled by a local data link 142, which in various embodiments incorporates, for example, an address bus, a data bus, a serial bus, a parallel bus, or any combination of these.

The computing device 130 communicates information to and requests input from the user or other devices by way of the I/O 136, which in various embodiments incorporates, for example, an interactive, menu-driven, visual display-based user interface, or graphical user interface (GUI), a pointing device, such as a, with which the user may interactively input information using direct manipulation of the GUI.

The computing device 130 is coupled to the communication network 26 of FIG. 1 by way of the network interface 140, which in various embodiments incorporates, for example, any combination of devices—as well as any associated software or firmware—configured to couple processor-based systems, including modems, access points, network interface cards, LAN or WAN interfaces, wireless or optical interfaces and the like, along with any associated transmission protocols, as may be desired or required by the design.

The computing device 130 can be used, for example, to implement the functions of the components of the co-channel interference control system 100 of FIG. 3. In various embodiments, the computing device 130 can include, for example, a server, a controller, a workstation, a mainframe computer, personal computer (PC), or the like.

Programming code, such as source code, object code or executable code, stored on a computer-readable medium, such as the storage 138 or a peripheral storage component coupled to the computing device 130, can be loaded into the memory 134 and executed by the processor 132 in order to perform the functions of the exemplary co-channel interference control system 100 of FIG. 3.

Figure 5:
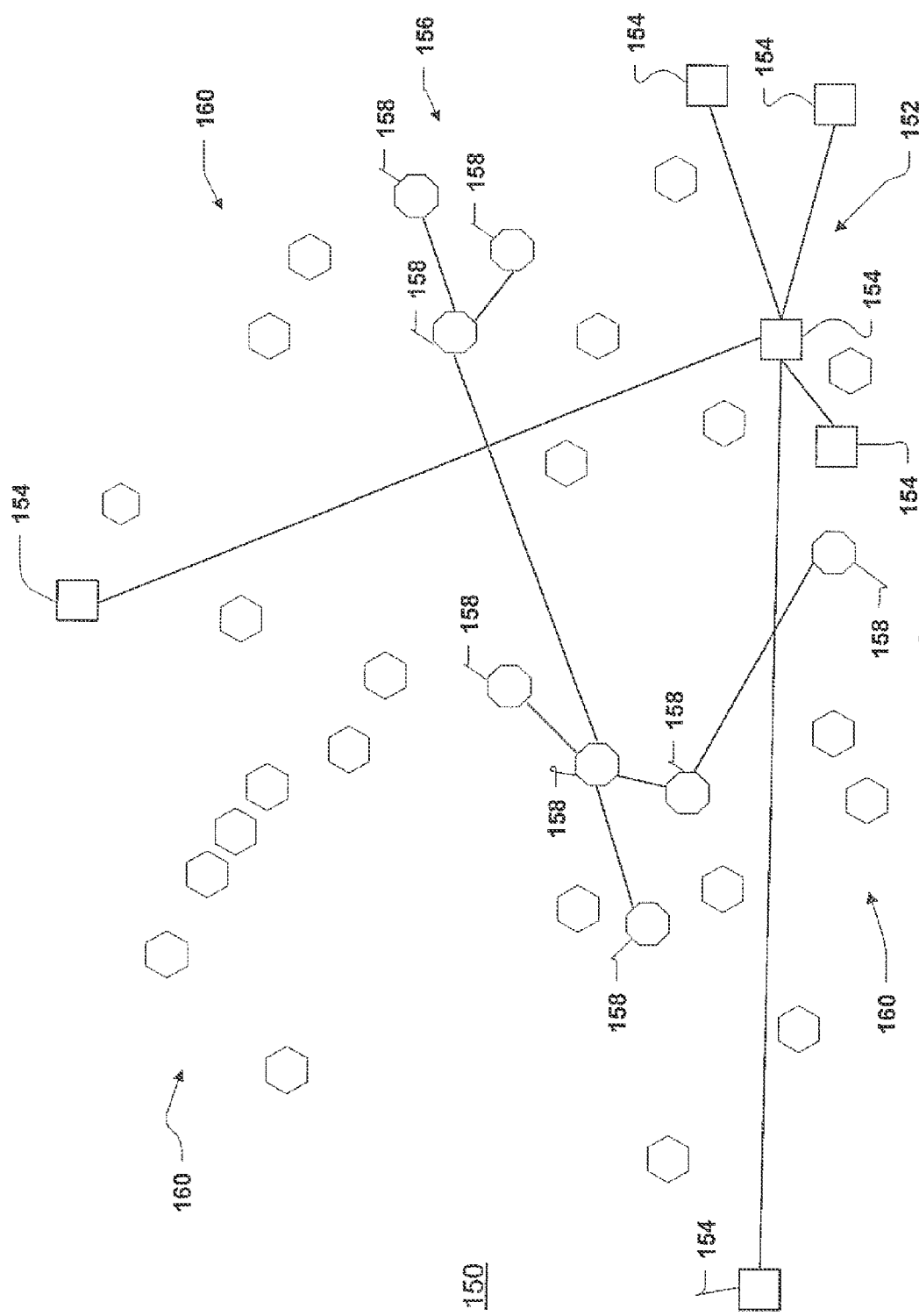
FIG. 5 is an illustration depicting an exemplary radio coordination graph (RCG).

Referring to FIG. 5, an exemplary radio coordination graph (RCG) 150 is illustrated. The radio coordination graph 150 is an undirected graph that can be created, for example, by the cluster module 104 of FIG. 3 to indicate which transmit points, also referred to as Transmit Points (TPs) or base stations, should be considered together to resolve or mitigate co-channel interference. The radio coordination graph captures the dominant interference relationships among transmit points in a communications network. As compared with some existing solutions, RCG-based graphical solutions can advantageously achieve similar or better QoE at dramatically reduced RC complexity.

Two clusters can be identified in the radio coordination graph 150 of FIG. 5, a first cluster 152 including six transmit points 154 (represented by squares), and a second cluster 156 including eight transmit points 158 (represented by octagons). The transmit points in each cluster are interrelated by a contiguous chain of dominant interference relationships between pairs of the transmit points. The RCG 150 also includes a number of additional transmit points 160 (represented by hexagons) that are not included in a cluster. Thus, the six transmit points 154 in the first cluster 152 can be advantageously controlled as one closed-loop grouping, and the eight transmit points 158 in the second cluster 156 can be advantageously controlled as another closed-loop grouping.

As explained in the following paragraphs, the RCG 150 can be constructed by taking the base stations in a network as vertices and adding arcs between vertices that have a dominant interference relationship. RC clustering generates disjoint base station clusters such that base stations having a dominant interference relationship are included in the same cluster, and each cluster has an RC capability not less than a predetermined threshold value, for example, $\gamma$.

Each base station has a radio coordination (RC) capability, which indicates how suitable it is for being a part of a cluster in a radio coordination process. Depending on the employed RC scheme, RC capability can be measured using any one of various factors, or a combination of factors, such as available power, available bandwidth, loading, or the like. In various embodiments, the individual transmit point RC capabilities can all be defined to be equal. In other embodiments, the characteristics that define the suitability of the individual transmit point for RC clustering can vary. For example each transmit point in the network can be differently characterized, based on available power, available bandwidth, loading, or a combination of these factors.

Each cluster of transmit points also has an aggregate cluster RC capability. In various embodiments, the RC capability of a cluster may be defined, for example, as the total (aggregate) RC capability of the member base stations, the average RC capability of the member base stations (the total RC capability of members divided by the cluster size), or the relative RC capability of the member base stations (total RC capability divided by the number of congested member nodes). If uniform RC capability is assigned to each individual transmit point, using the total capability of the member base stations is equivalent to using cluster size as the cluster RC capability. In some embodiments, the target cluster RC capability can be increased or relaxed based on RC feedback to provide an adaptive configuration.

The remote base station is considered to be interfering with the local base station, with respect to a particular user, if the spectrum efficiency (SE, also referred to as spectral efficiency or bandwidth efficiency) of the wireless link, or communication channel, between the remote base station and the user is larger than a predetermined threshold value, $\alpha$. In various embodiments, the SE threshold, $\alpha$, can be set to various levels, for example, 0.01 bits/s/Hz, 0.001 bits/s/Hz, 0.0001 bits/s/Hz, or the like. The terms "local" and "remote," as used herein, do not distinguish the relative locations of the base stations, but rather, distinguish between the interfering and interfered base stations.

For example, the communication channel, $\overrightarrow{au}$, through which the local base station, a, serves the user, u, has spectrum efficiency, $SE_{\overrightarrow{au}}$. Where $U_a$ represents the set of users served by the local base station, a. A remote base station, b, b≠a, is considered interfering with the local base station, a, at the user, u, u∈$U_a$, if, and only if, the channel, $\overrightarrow{bu}$, from the remote base station, b, to the user, u, has spectrum efficiency, $SE_{\overrightarrow{bu}}$ greater than a threshold value, $\alpha$, where $\alpha$ is a system parameter. The interference relationship may be denoted by $$b \xrightarrow{\alpha} \overrightarrow{au},$$

u∈$U_a$.

Thus, the RCG 150 is calculated on the basis of interference to all users served by the base station, a. In an embodiment, the interference relationship between a local base station and a remote base station on a radio frequency channel is said to be dominant if the interference contribution from the remote base station with respect to the local base station is larger than a predetermined interference domination threshold (IDT). The interference contribution of the remote base station with respect to the local base station and the user is computed as 1 minus the ratio of the signal-to-interference-plus-noise ratio (SINR) of the channel between the local base station and the user in the presence of the remote station to that in the absence of the remote base station, which falls in range of zero to one (0,1).

For example, the interference contribution of b to $\overrightarrow{au}$ is the following:

$$e_b(\overrightarrow{au}) = 1 - \frac{SINR_{\overrightarrow{au}}}{SINR_{\overrightarrow{au}}^{-b}}$$

where $SINR_{\overrightarrow{au}}$ is the signal-to-interference-plus-noise ratio (SINR) of the channel, $\overrightarrow{au}$, and $SINR_{\overrightarrow{bu}}$ is the signal-to-interference-plus-noise ratio (SINR) of the channel, $\overrightarrow{au}$, in the absence of the remote base station, b. The value of $e_b(\overrightarrow{au})$ falls in the range, (0,1).

The interference relationship, $$b \xrightarrow{\alpha} \overrightarrow{au},$$

$u \in U_a$, is dominating on the channel, $\overrightarrow{au}$, with respect to $\delta_a$ if, and only if, of $e_b(\overrightarrow{au}) > \delta_a$, where $\delta_a$ is an IDT at a. The dominant interference relationship can be written as $$b \stackrel{a,\delta_a}{\Longrightarrow} \overrightarrow{au},$$

$u \in U_a$. Given $\alpha$, $\delta_a$, and $\delta_b$, an undirected arc ab is added to the RCG between vertices a and b if, and only if $$a \stackrel{a,\delta_b}{\Longrightarrow} \overrightarrow{bu},$$

$\exists u \in U_b$ or $$b \stackrel{a,\delta_a}{\Longrightarrow} \overrightarrow{au},$$

$\exists u \in U_a$.

In general, a connected component is a subgraph in which vertices are directly connected, that is, through no additional vertices in the supergraph. In the context of a wireless network, this would define a collection of TPs that are connected in the graph by an arc, without requiring connection to a base station outside the collection. Connected components can be identified through depth-first or breadth-first searches of the graph. A meaningfully component contains at least one primary base station, that is, a base station that is experiencing congestion. In the radio coordination context, a valid connected component is one that is meaningful and that satisfies a minimum RC capability requirement, or threshold.

In an embodiment, a dynamic RC clustering algorithm can be employed to construct an RCG graph containing a number of valid connected components and groups the connected components together as clusters. In some embodiments, the clustering algorithm attempts to optimize or maximize the number of valid connected components and defines the connected components as clusters. Maximizing the number of valid connected components may imply minimizing cluster size, which in turn can lead to minimized RC optimization complexity. Once again, a valid connected component is one that contains at least one base station that is experiencing congestion and that satisfies a minimum RC capability requirement.

By way of a simplified description, when creating a graph, like the graph of FIG. 5, each network Transmit Point (TP) is selected. The UEs served by the TP are then looked at individually. For each UE served by a first TP in the network, the interference caused by each TP in the network (excluding the first TP) is quantified. This process is then repeated for each TP. This allows for a determination of the overall interference that a TP inflicts upon another TP. At this point, an interference threshold can be defined. Any TP that does not inflict aggregate interference above the threshold is ignored. Interference above the threshold can be considered to be dominant interference in the language used above. With a low threshold, it is likely that all nodes will be connected to each other (directly or indirectly). A sufficiently high threshold will leave each node unconnected to the remaining nodes. By adjusting the threshold, the graph of FIG. 5 can be created, and clusters can be identified. The adjustment of the threshold can be done so that cluster size can be constrained to a computationally manageable level. Similarly, cluster sizes can be kept away from being so small that there are minimal performance enhancements for the operation of the network. Those skilled in the art will appreciate that this will create a graph having subsets of nodes that are connected by a contiguous chain of links that correspond to interference relationships between pairs of TPs, where the interference is above the defined threshold.

Presented below are two example RCG-based graph algorithms for solving the clustering problem. Both presented algorithms are filtering algorithms that filter out non-dominant interference relationships during RCG construction. As further explained below, this filtering is realized by setting proper IDT values for the transmit points. Toward this end, the IDT values are selected through an binary search within the value range, for example, (0,1). Each of the algorithms has three input parameters: SE threshold ($\alpha$), target cluster RC capability ($\gamma$) and interference set hop count limit ($\eta$, where hops correspond to arcs in the graph).

As a first example algorithm for constructing an RCG to identify radio coordination clusters in a network, incremental local filtering (ILF) builds the RCG using a bottom-up approach, that is, by merging multiple localized RCG subgraphs. As further explained in the following paragraphs, ILF independently builds a local RCG graph for each congested base station, and then merges overlapping local graphs to obtain a global graph for the network. The resultant disjoint subsets as output as network transmit point clusters.

For example, initial local RCG subgraphs, $G_a$, are constructed in the vicinity of primary base stations, a, and the subgraphs are merged to obtain the total RCG. Given a spectrum efficiency threshold, $\alpha$, RCG construction is essentially a process of finding proper IDT values at the base stations. For every base station, b, b ≠ a, the IDT value of the base station, b, defined in $G_a$ may be denoted $\delta_b^a$. Graph merging determines the final IDT value, $\delta_b$, of b by $\delta_b = \max_{a \in P} \{\delta_b^a\}$, where P, $P \subseteq B$, is the primary base station set and B the total base station set.

The k-hop dominant interference set, k≥0, of the primary base station, a, is defined as:

$$I_a^k = \begin{cases} \{a\}, k = 0 \\ \{b | b \in B; b \in I_a^{k-1}; \text{or, } b \stackrel{a,\delta_c}{\Longrightarrow} \overrightarrow{cu}, u \in U_c, c \in I_a^{k-1}\}, k > 0 \end{cases}$$

Thus, for example, $I_a^1$ represents the set of direct dominant interference sources. The i-increment set, or differential dominant interference set, is defined as:

$$D_a^i = \begin{cases} I_a^0, i = 0 \\ I_a^i / I_a^{i-1}, i > 0 \end{cases}$$

Note that $D_a^i \cap D_a^j = \emptyset, i \neq j$ and $I_a^k = \cup_{i=1}^k D_a^i$. Further, $D_a^i(t)$ is defined as $D_a^i$ conditioned on $\delta_b = t, \forall b \in D_a^{i-1}$.

Subgraph, $G_a$, is built through a number of successive steps. Denote by $G_a^i$ the subgraph obtained after step i. Initially, the subgraph, $G_a$, contains only the primary base station, a, that is, $G_a^0 = \{a\}$. At step i, i>0, a unified IDT value t is found for all base stations in $D_a^{i-1}$ through a binary search in range (0,1), and $G_a^i$ is obtained as:

$$G_a^i = I_a^i = I_a^{i-1} \cup D_a^i(t)$$

The IDT value, t, is the maximum among the IDT values that minimize the distance between the RC capability, $\gamma_{G_a^i}$, of the subgraph, $G_a^i$, and $\gamma$. The building process stops after k steps and outputs $G_a^k$ as $G_a$, when $G_a^k$ meets the RC capability requirement, when $D_a^{k+1}$ is empty, or when k reaches a growth limit, $\eta$.

With respect to an arbitrary primary base station, the zero-hop dominant interference set contains only the arbitrary primary base station. The k-hop dominant interference set of the arbitrary primary base station, for any positive integer k, contains the (k−1)-hop set plus the k-increment set, that is, the set of base stations that are not in the (k−1)-hop set but have a dominant interference relationship with a base station in the (k−1)-hop set. The one-hop dominant interference set is referred to as the direct dominant interference set.

Figure 6:
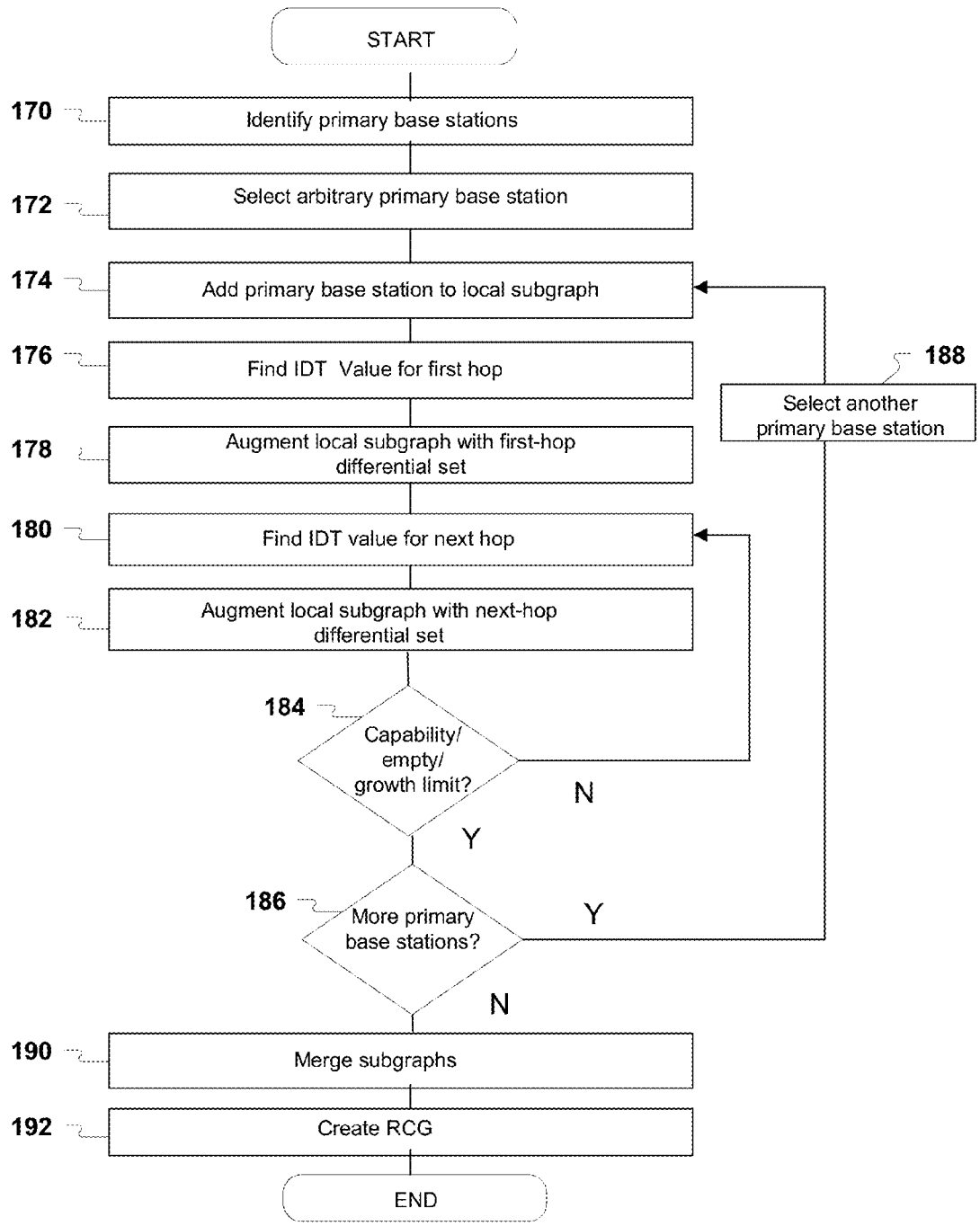
FIG. 6 is a flowchart representing an exemplary incremental local filtering (ILF) process flow in accordance with an embodiment of the present invention.

Referring now to FIG. 6, an exemplary incremental local filtering process flow is illustrated that may be performed, for example, by the cluster module 104 of FIG. 3 to implement an embodiment of the method described in this disclosure for adaptive clustering of transmit points for radio coordination. The process begins at block 170, where all primary base stations in the network, that is, all base stations in the network that experience congestion, are identified. In block 172, an arbitrary primary base station is selected from among the identified primary base stations.

In block 174, an initial local subgraph, that is, the zero-hop dominant interference set of the selected primary base station, is created by adding the selected primary base station to the local subgraph. In block 176, a binary search is performed in the range, (0, 1), to find a unified IDT value for all base stations in the differential set that defines the difference between the zero-hop set and the one-hop set. The unified IDT value is the maximum among the IDT values that minimize the difference between the RC capability of the one-hop subgraph and the target, or minimum required RC capability, $\gamma$. In block 178, the local subgraph is augmented with the base stations in the differential set correlating the zero-hop set with the one-hop set to construct the one-hop subgraph.

In block 180, another binary search is performed in the range, (0, 1), to find a unified IDT value for all base stations in the differential set correlating the current-hop [(i−1)-hop] set with the next-hop (i-hop) set. The unified IDT value is the maximum among the IDT values that minimize the difference between the RC capability of the next-hop (i-hop) subgraph and the target RC capability, $\gamma$. In block 182, the local subgraph is augmented with the base stations in the differential set correlating the current-hop [(i−1)-hop] set with the next-hop (i-hop) set to construct the next-hop (i-hop) subgraph.

In block 184, a determination is made regarding whether or not: 1) the local RCG meets the RC capability requirement, 2) the differential set correlating the current-hop [(i−1)-hop] set with the next-hop (i-hop) set is empty, or 3) the number of iterations has reached a growth limit, for example, $\eta$. If none of these conditions is true, the process continues at block 180, where another binary search is performed, and so on. Otherwise, if any of the conditions in block 184 is true, the local subgraph construction process stops.

In block 186, a determination is made regarding whether or not subgraphs have been constructed for all of the primary base stations. If not, in block 188, an additional primary base station is arbitrarily selected from among the remaining primary base stations that are not yet included in a subgraph, and the process continues at block 174.

Otherwise, if it is determined in block 186 that subgraphs have been constructed for all of the primary base stations, then in block 190 all of the subgraphs are merged to form a global graph. In block 192, meaningful connected components, that is, connected components that include at least one primary base station, are identified in the global graph to create the resultant radio coordination graph (RCG).

An example of pseudocode for a method of performing the disclosed incremental local filtering (ILF) follows:

```
LOCALIMCRENTALFILTERING
Require: Initialize α, γ, η
  1:     R ← ∅
  2:     G ← U_{a∈P} BUILDRCGSUBGRAPH(a, α, γ, η), ∀a ∈ P
  3:     find meaningful connected components in G
  4:     for all meaningful connected component C do
  5:         R ← R ∪ {C}
  6:     end for
  7:     return R
BUILDRCGSUBGRAPH
Require: Initialize a (primary base station), α, γ, η
  1:     G_a ← {a}; i ← 0
  2:     while i ≤ η and γ_{Ga} < γ and D_a^i ≠ ∅ do
  3:         t ← 1; [t_{min}, t_{max}] ← [0, 1]
  4:         while t_{max} − t_{min} > ∈ do
  5:             t ← (t_{min} + t_{max})/2
  6:             G_a' ← G_a ∪ D_a^i(t)
  7:             if γ_{Ga'} ≥ γ then
  8:                 t_{min} ← t
  9:             else
 10:                 t_{max} ← t
 11:             end if
 12:         end while
 13:         G_a ← G_a ∪ D_a^i(t)
 14:         for all b ∈ D_a^{i−1}(t) do
 15:             δ_b^a ← t
 16:         end for
 17:         i ← i + 1
 18:     end while
 19:     create arcs in G_a
 20:     return G_a
```

As a second example algorithm for constructing an RCG to identify radio coordination clusters in a network, recursive collective filtering (RCF) takes a top-down approach, that is, by recursively simplifying an initially relatively complex RCG graph. RCF builds an initial detailed RCG graph by setting the IDT value to zero for all base stations in the network. Then, the graph is recursively simplified by increasing the IDT values at selected base stations. The IDT increment value is not necessarily uniform across the selected base stations, but rather, may incrementally rise over graph distance from the primary base station set.

Increasing the IDT values may cause some initially existing arcs to be removed from the RCG or may result in graph partitions, splitting the set into disjoint subsets meeting the RC capability requirement. The algorithm is recursively run for each disjoint subset in order to minimize the size of connected components. The resultant disjoint subsets are output as network transmit point clusters.

For example, an initial RCG graph is constructed by setting $\delta_a = 0, \forall a \in B$. Then, the graph is simplified by increasing the IDT values at the base stations. The value increase is not necessarily uniform, but may rise up, starting from a seed value $\theta$, $0 \leq \theta \leq 1$, over graph distance to primary base stations.

Given an RCG graph G, denote by $P_G$, $P_G \subseteq P$, the set of primary base stations in G. Let $d_G(b)$, $b \in G$ be the graph distance of b to $P_G$, that is:

$$d_G(b) = {}_{a \in P_G}^{min} d_G(a,b).$$

where $d_G(a,b)$ is the graph distance between a and b in G. When updating the IDT value, $\delta_a$, of base station a, the value is updated to $f_\eta(\theta,k)$, $k=d_G(a,b)$, where $f_\eta(\dots)$ is a scaling function at system parameter $\eta$. Given $\eta$, $\eta \geq 1$, the scaling function, $f_\eta(\dots)$, is a non-decreasing function of both $\theta$ and k, and has the following properties:

$$f_\eta(\theta, k) \begin{cases} = \theta, k = 0 \\ \geq \theta, 0 < k \leq \eta \\ \geq 1, k > \eta \end{cases}$$

In addition, for fixed $\theta$ and k, the function value of $f_\eta(\theta,k)$ does not decrease over $\eta$. Such a scaling function can be easily defined, for example, the following two-stage function:

$$f_\eta(\theta, k) = \begin{cases} \eta^k \theta, & 0 \leq k \leq \eta \\ 1, & k > \eta \end{cases}$$

Figure 7:
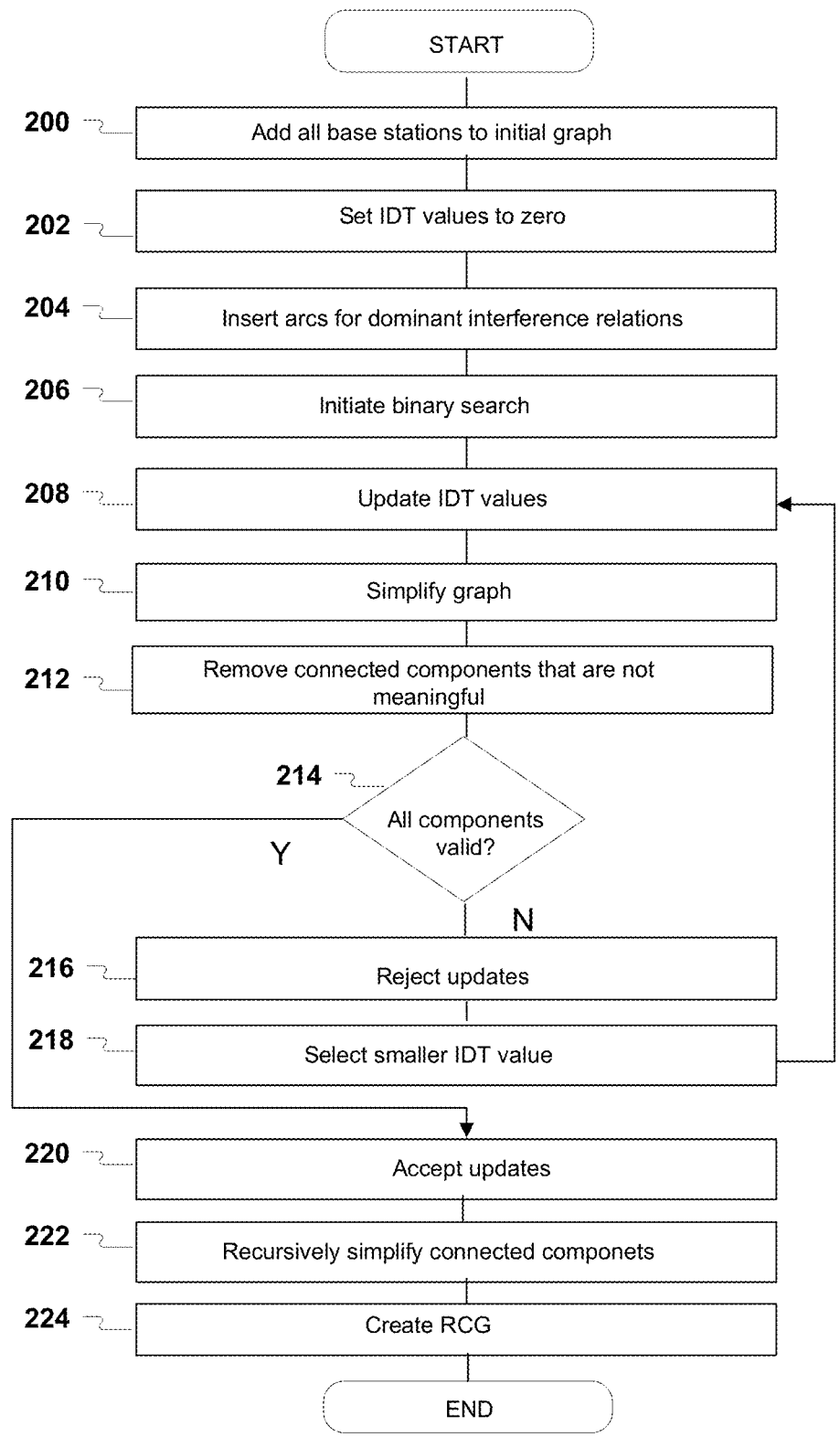
FIG. 7 is a flowchart representing an exemplary recursive collective filtering (RCF) process flow in accordance with an embodiment of the present invention.

Referring now to FIG. 7, an exemplary recursive collective filtering process flow is illustrated that may be performed, for example, by the cluster module 104 of FIG. 3 to implement an embodiment of the method described in this disclosure for adaptive clustering of transmit points for radio coordination. The process begins at block 200, where all of the base stations in the network are added as vertices to an initial graph.

In block 202, the IDT value is set to zero for all of the base stations. In block 204, an initial undirected graph is created by inserting arcs between all pairs of vertices in the graph that represent base stations having a dominant interference relationship, that is, between all pairs of base stations among which the interference contribution of one base station of the pair with respect to a communication channel of the other base station of the pair is greater than zero. In block 206, a binary search for an IDT value is initiated in the range, (0, 1), using an initial seed value of one-half.

In block 208, the IDT value for each base station in the graph is updated according to a scaling function, $f_\eta(\theta, k)$, at a system parameter, $\eta$. The scaling function $f_\eta(\dots)$ is a non-decreasing function of both the seed value, $\theta$, and the minimum graph distance, k, between each base station and any primary base station.

As described above, the value of the scaling function is equal to the seed value when the minimum graph distance is zero (k=0); greater than or equal to the seed value when the minimum graph distance is greater than zero and less than or equal to the system parameter ($0 < k \leq \eta$); and greater than or equal to one when the minimum graph distance is greater than the system parameter ($k > \eta$).

In addition, for fixed seed value, $\theta$, and graph distance, k, the value of the scaling function, $f_\eta(\theta, k)$, does not decrease over the range of $\eta$. A person of ordinary skill in the art will understand how to define such a scaling function. For example, in an embodiment, the formula is the following two-stage function: $f_\eta(\theta, k) = \eta^k \theta$ for $0 \leq k \leq \eta$ and $f_\eta(\theta, k) = 1$ for $k > \eta$.

In block 210, the graph is simplified by removing arcs between pairs of base stations in the graph that no longer have a dominant interference relationship given the updated IDT values. Any connected components that are not meaningful, that is, connected components that do not include at least one primary base station, are removed from the graph in block 212.

In block 214, a determination is made regarding whether or not each of the meaningful connected components is valid, that is, whether the component RC capability meets the required minimum capability requirement, $\gamma$. If any of the meaningful connected components does not meet the RC capability requirement, then in block 216 the IDT value increase and associated graph updates are rejected, and in block 218, a smaller seed value, $\theta$, is selected and the binary search continues at block 208.

Otherwise, if all of the meaningful connected components meet the RC capability requirement in block 214, then in block 220, the IDT value increase and associated graph updates are accepted. In block 222, the process is recursively performed, from block 208 through block 220, with respect to each resultant connected component using an increased seed value to simplify the respective subgraphs. When the binary search is completed, the final group of disjoint connected components, or the entire graph if not partitioned, form the resultant radio coordination graph (RCG), in block 224.

An example of pseudocode for a method of performing the disclosed recursive collective filtering (RCF) follows:

```
RECURSIVECOLLECTIVEFILTERING
Require: Initialize α, γ, η
  1:   G ← ∪_{b∈B}{b}
  2:   δ_b ← 0, ∀b ∈ B
  3:   create arcs in G
  4:   R = SIMPLIFYRCGGRAPH(G, 0, α, γ, η)
  5:   return R
SIMPLIFYRCGGRAPH
Require: Initialize G (RCG graph), θ, α, γ, η
  1:   G' ← G; S = ∅; invalid ← true; t ← 1
  2:   while invalid = true and t − θ > ∈ do
  3:      t ← (θ + t)/2
  4:      δ_b ← f_η(t,d_G(b)), ∀b ∈ G
  5:      re-create arcs in G
  6:      find meaningful connected components in G
  7:      invalid ← false
  8:      for all meaningful connected component C do
  9:         invalid ← (γ_C < γ)
 10:         if invalid = true then
 11:            S = ∅
 12:            break
 13:         else
 14:            S ← (C, t)
 15:         end if
 16:      end for
 17:   end while
 18:   if S = ∅ then
 19:      R ← {G'}
 20:   else
 21:      R ← ∪_{(C,t)∈S} SIMPLIFYRCGGRAPH(C, t, α, γ, η)
 22:   end if
 23:   return R
```

Both the incremental local filtering (ILF) procedure and the recursive collective filtering (RCF) procedure have an average computational complexity coarsely bounded above by $O(mn^3 \log \lceil \gamma/\epsilon \rceil)$, where m is the total number of users and n=|B| is the total number of base stations. Compared to some existing radio coordination solutions, dynamic RC clustering using ILF or RCF can advantageously provide relatively low radio coordination complexity, for example, relatively few RC runs and relatively small average RC cluster sizes.

Aspects of this disclosure are described herein with reference to flowchart illustrations or block diagrams, in which each block or any combination of blocks can be implemented by computer program instructions. The instructions may be provided to a processor of a general purpose computer, special purpose computer, or other programmable data processing apparatus to effectuate a machine or article of manufacture, and when executed by the processor the instructions create means for implementing the functions, acts or events specified in each block or combination of blocks in the diagrams.

In this regard, each block in the flowchart or block diagrams may correspond to a module, segment, or portion of code that including one or more executable instructions for implementing the specified logical function(s). It should also be noted that, in some alternative implementations, the functionality associated with any block may occur out of the order noted in the figures. For example, two blocks shown in succession may, in fact, be executed substantially concurrently, or blocks may sometimes be executed in reverse order.

A person of ordinary skill in the art will appreciate that aspects of this disclosure may be embodied as a device, system, method or computer program product. Accordingly, aspects of this disclosure, generally referred to herein as circuits, modules, components or systems, may be embodied in hardware, in software (including firmware, resident software, micro-code, etc.), or in any combination of software and hardware, including computer program products embodied in a computer-readable medium having computer-readable program code embodied thereon.

In this respect, any combination of one or more computer readable media may be utilized, including, but not limited to, an electronic, magnetic, optical, electromagnetic, infrared, or semiconductor system, apparatus, or device, or any suitable combination of these. More specific examples of computer readable storage media would include the following non-exhaustive list: a portable computer diskette, a hard disk, a random access memory (RAM), a read-only memory (ROM), an erasable programmable read-only memory (EPROM), a Flash memory, a portable compact disc read-only memory (CD-ROM), an optical storage device, network-attached storage (NAS), a storage area network (SAN), magnetic tape, or any suitable combination of these. In the context of this disclosure, a computer readable storage medium may include any tangible medium that is capable of containing or storing program instructions for use by or in connection with a data processing system, apparatus, or device.

Computer program code for carrying out operations regarding aspects of this disclosure may be written in any combination of one or more programming languages, including object oriented programming languages such as Java, Smalltalk, C++, or the like, as well as conventional procedural programming languages, such as the "C," FORTRAN, COBOL, Pascal, or the like. The program code may execute entirely on an individual personal computer, as a stand-alone software package, partly on a client computer and partly on a remote server computer, entirely on a remote server or computer, or on a cluster of distributed computer nodes. In general, a remote computer, server or cluster of distributed computer nodes may be connected to an individual (user) computer through any type of network, including a local area network (LAN), a wide area network (WAN), an Internet access point, or any combination of these.

It will be understood that various modifications may be made. For example, useful results still could be achieved if steps of the disclosed techniques were performed in a different order, and/or if components in the disclosed systems were combined in a different manner and/or replaced or supplemented by other components. Accordingly, other implementations are within the scope of the following claims.

What is claimed is:

1. An apparatus for adaptively defining clusters of transmit points for coordination in a communication network, the apparatus comprising:
a circuit configured to receive radio frequency communication channel information associated with the transmit points and define a subset of the transmit points in accordance with the received radio frequency communication channel information, the subset of the transmit points being interrelated by a contiguous chain of dominant interference relationships between pairs of the transmit points, wherein a dominant interference relationship is based on interference from a first transmit point of a transmit point pair to at least one user served by a second transmit point of the transmit point pair, the interference from the first transmit point to the at least one user served by the second transmit point being calculated based on a total signal-to-interference-plus-noise ratio corresponding to a radio frequency communication channel between the second transmit point and the at least one user served by the second transmit point, and a partial signal-to-interference-plus-noise ratio corresponding to the radio frequency communication channel absent the first transmit point.

2. The apparatus of claim 1, wherein the circuit further determines that the subset of the transmit points satisfies a radio coordination capability requirement.

3. The apparatus of claim 1, wherein the circuit further receives an indication associated with congestion corresponding to a first transmit point of the transmit points and includes the first transmit point in the subset.

4. The apparatus of claim 1, wherein the circuit further derives dominant interference relationships between pairs of the transmit points based at least in part on the radio frequency communication channel information, and constructs an undirected graph including vertices representing a subset of the transmit points and arcs between pairs of the vertices, the arcs representing a contiguous chain of the dominant interference relationships.

5. The apparatus of claim 1, further comprising a processor that independently coordinates radio communications among the subset of the transmit points.

6. The apparatus of claim 5 further comprising a configuration module that receives radio coordination quality feedback from the processor and adapts configuration parameters based on the radio coordination quality feedback.

7. A method for adaptively clustering transmit points for coordination in a communication network, the method comprising:
receiving, with a processor, radio frequency communication channel information associated with interference relationships between the transmit points; and
defining a subset of the transmit points based at least in part on the radio frequency communication channel information, wherein nodes in the subset are connected to each other by a contiguous chain of dominant interference relationships between pairs of the transmit points, wherein a dominant interference relationship is based on interference from a first transmit point of a transmit point pair to at least one user served by a second transmit point of the transmit point pair, the interference from the first transmit point to the at least one user served by the second transmit point being calculated based on a total signal-to-interference-plus-noise ratio corresponding to a radio frequency communication channel between the second transmit point and the at least one user served by the second transmit point, and a partial signal-to-interference-plus-noise ratio corresponding to the radio frequency communication channel absent the first transmit point.

8. The method of claim 7, further comprising independently coordinating radio communications among the subset of the transmit points.

9. The method of claim 7, further comprising:
receiving radio coordination quality feedback; and
adapting configuration parameters based on the radio coordination quality feedback.

10. The method of claim 7, further comprising receiving an indication associated with congestion corresponding to a first transmit point of the transmit points, wherein defining the subset of the transmit points further comprises including the first transmit point in the subset.

11. The method of claim 7, wherein defining the subset of the transmit points further comprises determining that the subset of the transmit points satisfies a radio coordination capability requirement.

12. The method of claim 7, wherein defining the subset of the transmit points further comprises:
determining that a spectrum efficiency of a first radio frequency communication channel corresponding to a first transmit point, a radio frequency bandwidth and a user exceeds a predetermined interference threshold, wherein a second radio frequency communication channel corresponds to a second transmit point, the radio frequency and the user; and
determining that an interference contribution by the first transmit point with respect to the second radio frequency communication channel exceeds a predetermined interference domination threshold, wherein the subset of the transmit points comprises the first transmit point and the second transmit point.

13. The method of claim 12, wherein defining the subset of the transmit points further comprises determining that the interference contribution by the first transmit point with respect to the second radio frequency communication channel is equal to one minus a ratio of a total signal-to-interference-plus-noise ratio corresponding to the second radio frequency communication channel and a partial signal-to-interference-plus-noise ratio corresponding to the second radio frequency communication channel absent the first transmit point.

14. A method for adaptively clustering transmit points for coordination in a communication network, the method comprising:
receiving, with a processor, radio frequency communication channel information corresponding to the transmit points;
deriving dominant interference relationships between pairs of the transmit points based at least in part on the radio frequency communication channel information, wherein a dominant interference relationship is based on interference from a first transmit point of a transmit point pair to at least one user served by a second transmit point of the transmit point pair, the interference from the first transmit point to the at least one user served by the second transmit point being calculated based on a total signal-to-interference-plus-noise ratio corresponding to a radio frequency communication channel between the second transmit point and the at least one user served by the second transmit point, and a partial signal-to-interference-plus-noise ratio corresponding to the radio frequency communication channel absent the first transmit point;
constructing an undirected graph including vertices representing a subset of the transmit points and arcs between pairs of the vertices, the arcs representing a contiguous chain of the dominant interference relationships; and
defining the subset of the transmit points as a radio coordination cluster.

15. The method of claim 14, further comprising receiving an indication associated with congestion corresponding to a first transmit point of the transmit points, wherein constructing the undirected graph further comprises initiating a local graph with a single vertex representing the first transmit point and incrementally augmenting the local graph with vertices and arcs representing one or more next-increment dominant interference sets.

16. The method of claim 15, wherein incrementally augmenting the local graph with vertices and arcs representing one or more next-increment dominant interference sets further comprises performing a binary search in the range of zero to one to find a unified interference domination threshold with respect to a previous-increment differential dominant interference set.

17. The method of claim 16, wherein constructing the undirected graph further comprises finalizing the undirected graph when the subset of the transmit points satisfies a radio coordination capability requirement, a next-increment differential dominant interference set is empty, or a number of increments reaches a growth limit.

18. The method of claim 14, wherein constructing the undirected graph further comprises employing an incremental local filtering procedure.

19. The method of claim 14, wherein constructing the undirected graph further comprises initiating a global graph including vertices representing all of the transmit points in the communication network and arcs representing all interference relationships between the transmit points, and recursively simplifying the global graph by increasing an interference domination threshold with respect to remaining transmit points in the global graph.

20. The method of claim 19, further comprising receiving an indication associated with congestion corresponding to a first transmit point of the transmit points, wherein increasing the interference domination threshold further comprises updating the interference domination threshold according to a non-decreasing scaling function at a system parameter, the scaling function based on a seed value and a minimum graph distance between each base station and the first transmit point.

21. The method of claim 14, wherein constructing the undirected graph further comprises employing a recursive collective filtering procedure.

* * * * *